(12) United States Patent
Hirama

(10) Patent No.: US 11,431,904 B2
(45) Date of Patent: Aug. 30, 2022

(54) IMAGE BLUR CORRECTION APPARATUS, CONTROL METHOD THEREFOR, IMAGE CAPTURING APPARATUS, AND STORAGE MEDIUM

(71) Applicant: CANON KABUSHIKI KAISHA, Tokyo (JP)

(72) Inventor: Tomohiro Hirama, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/446,384

(22) Filed: Aug. 30, 2021

(65) Prior Publication Data

US 2022/0070377 A1 Mar. 3, 2022

(30) Foreign Application Priority Data

Sep. 2, 2020 (JP) .............................. JP2020-147675

(51) Int. Cl.
*H04N 5/232* (2006.01)

(52) U.S. Cl.
CPC ..... *H04N 5/23267* (2013.01); *H04N 5/23277* (2013.01); *H04N 5/23287* (2013.01)

(58) Field of Classification Search
None
See application file for complete search history.

(56) References Cited

U.S. PATENT DOCUMENTS

| 2014/0049658 A1* | 2/2014 | Yamazaki | H04N 5/2328 348/208.11 |
| 2017/0019600 A1* | 1/2017 | Koyano | G02B 27/646 |
| 2017/0251147 A1* | 8/2017 | Ikeda | H04N 5/2358 |
| 2017/0353667 A1* | 12/2017 | Miyahara | H04N 5/23267 |
| 2018/0063439 A1* | 3/2018 | Miyazawa | H04N 5/23258 |
| 2018/0103207 A1* | 4/2018 | Miyazawa | H04N 5/23287 |
| 2019/0174062 A1 | 6/2019 | Miyahara | |
| 2020/0154051 A1* | 5/2020 | Takeuchi | H04N 5/23287 |
| 2020/0177816 A1* | 6/2020 | Takeuchi | H04N 5/23209 |

FOREIGN PATENT DOCUMENTS

| EP | 2187626 A1 | 5/2010 |
| JP | 2017-219635 A | 12/2017 |

OTHER PUBLICATIONS

The above documents were cited in a European Search Report dated Jan. 25, 2022, which is enclosed, that issued in the corresponding European Patent Application No. 21190050.1.

* cited by examiner

*Primary Examiner* — Cynthia Segura
(74) *Attorney, Agent, or Firm* — Cowan, Liebowitz & Latman, P.C.

(57) ABSTRACT

An image blur correction apparatus comprises an obtainment unit configured to obtain shake information; a plurality of image blur correction amount calculation units including a first image blur correction amount calculation unit configured to calculate image blur correction amounts that respectively correspond to partial images included among a plurality of continuous images, and a second image blur correction amount calculation unit configured to calculate image blur correction amounts that respectively correspond to partial images included among the plurality of continuous images with use of a method different from a method used by the first correction amount calculation unit; and control unit configured to control the plurality of image blur correction amount calculation units.

21 Claims, 11 Drawing Sheets

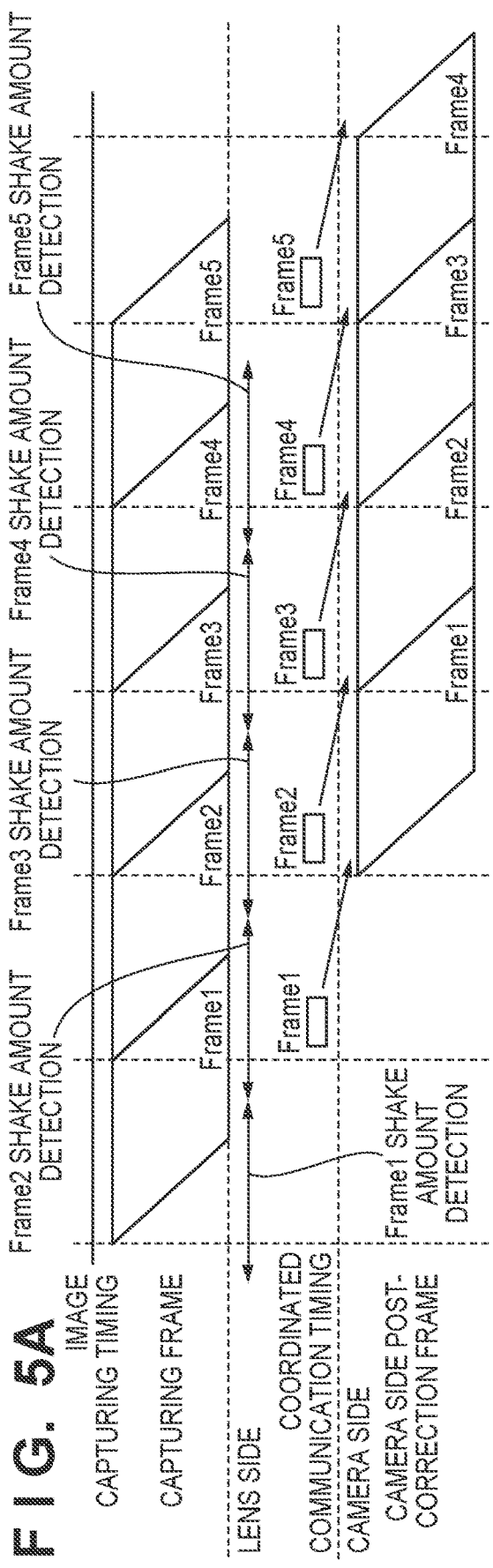
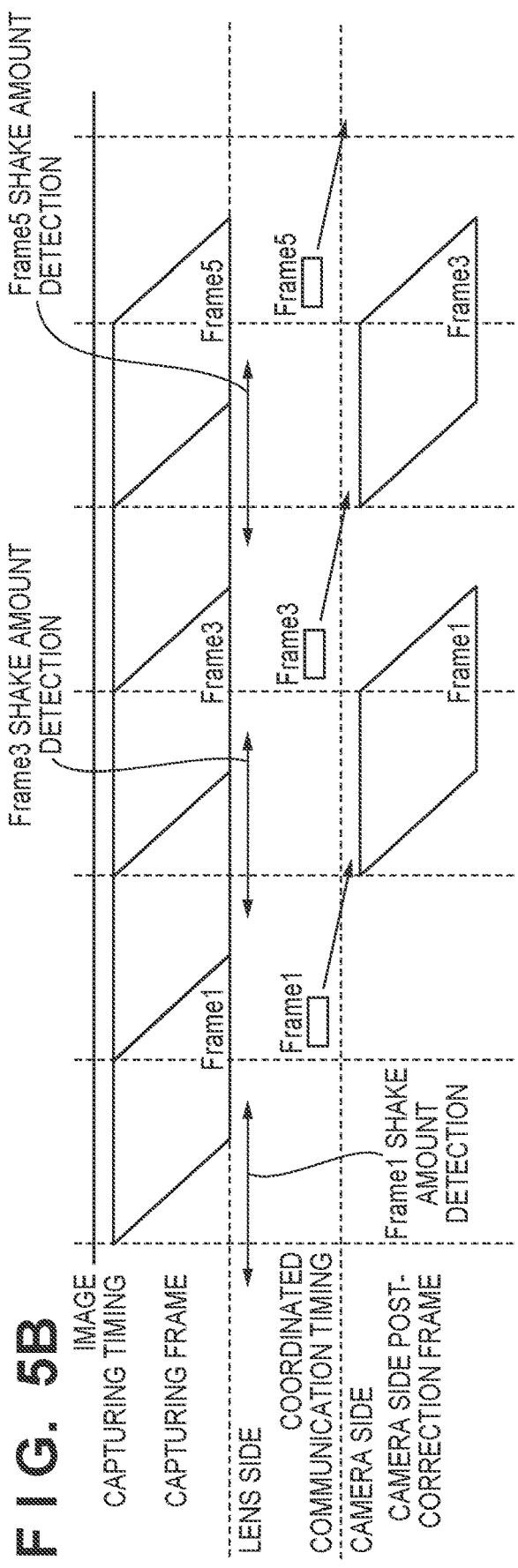

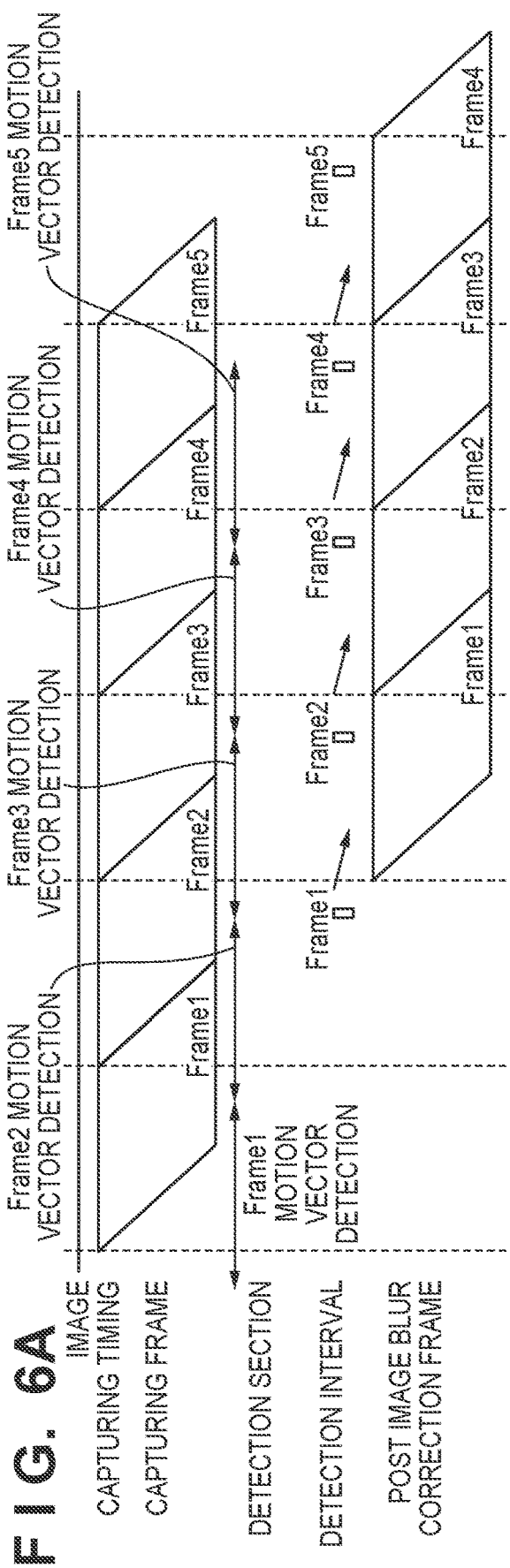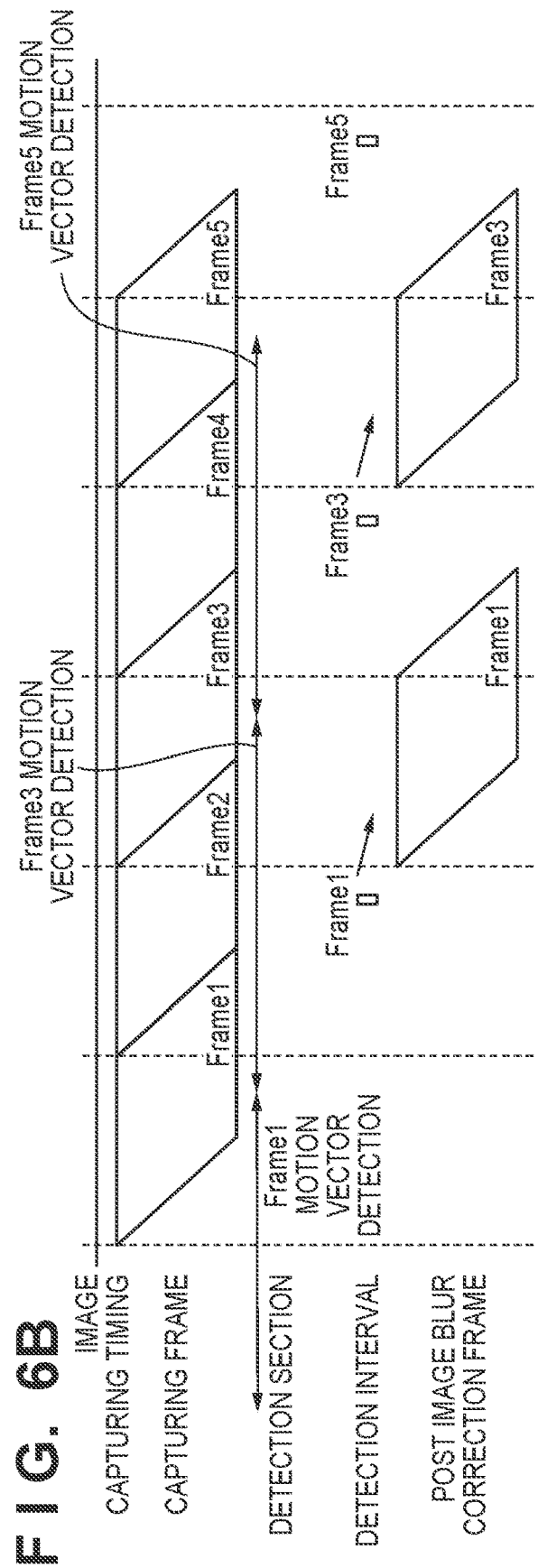

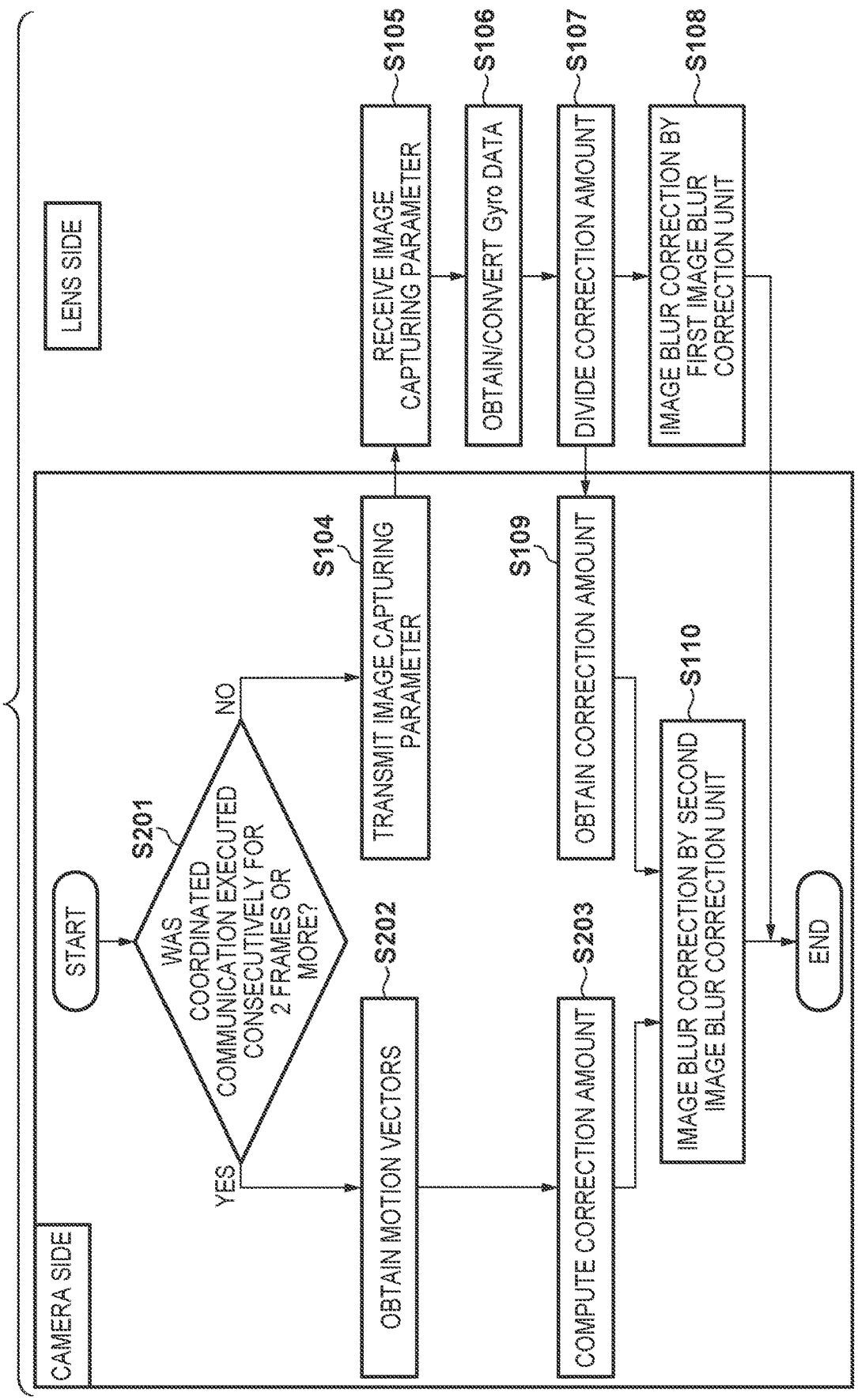

IMAGE BLUR CORRECTION APPARATUS, CONTROL METHOD THEREFOR, IMAGE CAPTURING APPARATUS, AND STORAGE MEDIUM

BACKGROUND OF THE INVENTION

Field of the Invention

The present invention relates to a technique in which image blur correction means mounted on a plurality of apparatuses perform image blur correction in coordination with one another via communication.

Description of the Related Art

In recent years, the video industry uses a method of obtaining smoother slow videos by performing shooting at a high-speed frame rate and using a reproduction speed that is equal to or lower than the shooting frame rate. However, this method performs shooting at a high-speed frame rate, and therefore increases a processing load on a camera. As a result, in a case where image blur correction means mounted on a plurality of apparatuses perform image blur correction control in coordination with one another via communication, a communication error and a communication delay occur. In view of this, a method has been proposed whereby a reduction in the image blur correction effects is suppressed even in a case where a communication error and a communication delay have occurred.

Japanese Patent Laid-Open No. 2017-219635 discloses a method of correcting image blur by selecting a blur correction amount obtained from shake information when the shake information has been obtained via communication, and by selecting a blur correction amount predicted by prediction means when the shake information has not been obtained via communication.

However, Japanese Patent Laid-Open No. 2017-219635 has the following problems. According to Japanese Patent Laid-Open No. 2017-219635, as a blur correction amount is calculated using a method that performs prediction from a previous correction amount, such as Kalman filtering and the method of least squares, the image blur correction effects are significantly reduced when an erroneous correction amount has been calculated.

Furthermore, while a communication error and a communication delay are improved by setting a low-speed communication cycle, setting a low-speed communication cycle will also reduce the speed of the cycle of obtainment of a signal for performing image blue correction, thereby reducing the image blur correction effects.

SUMMARY OF THE INVENTION

The present invention has been made in view of the aforementioned problems, and suppresses a reduction in the image blur correction effects when a low-speed communication cycle has been set in a case where image blur correction control is performed while communication is performed among a plurality of apparatuses.

According to a first aspect of the present invention, there is provided an image blur correction apparatus, comprising: at least one processor and/or circuit configured to function as following units: an obtainment unit configured to obtain shake information from a plurality of shake detection units configured to detect a shake; a plurality of image blur correction amount calculation units including a first image blur correction amount calculation unit configured to calculate, based on shake information from first shake detection unit that has been obtained by the obtainment unit, image blur correction amounts that respectively correspond to partial images included among a plurality of continuous images, and a second image blur correction amount calculation unit configured to calculate, based on shake information from second shake detection unit that has been obtained by the obtainment unit, image blur correction amounts that respectively correspond to partial images included among the plurality of continuous images with use of a method different from a method used by the first correction amount calculation unit; and control unit configured to cibtrik the plurality of image blur correction amount calculation units so that at least one of the plurality of blur correction amount calculation units obtains the image blur correction amounts respectively in correspondence with a plurality of continuous captured images, and so that an image for which an image blur correction amount is calculated by the first correction amount calculation unit among the plurality of blur correction amount calculation units, and an image for which an image blur correction amount is calculated by the second correction amount calculation unit among the plurality of blur correction amount calculation units, take place cyclically.

According to a second aspect of the present invention, there is provided an image capturing apparatus, comprising: an image capturing device that capture the plurality of continuous images; the image blur correction apparatus according to claim 1; and the second shake detection unit; and an image blur correction unit configured to perform image blur correction with respect to the plurality of continuous images based on blur correction amounts obtained by the plurality of blur correction amount calculation units, wherein the obtainment unit obtains a detection result of the first shake detection unit included in a mounted lens apparatus through communication on a second cycle that is longer than the first cycle.

According to a third aspect of the present invention, there is provided an image capturing apparatus, comprising: an image capturing sensor that captures a plurality of continuous images on a first cycle; and at least one processor and/or circuit configured to function as following units: a shake detection unit configured to detect a shake based on the plurality of images; a plurality of image blur correction amount obtainment units including a first blur correction amount obtainment unit configured to obtain, based on shake information obtained from a mounted lens apparatus through communication, image blur correction amounts that respectively correspond to partial images included among the plurality of continuous images, and a second image blur correction amount obtainment unit configured to obtain, based on a detection result of the shake detection unit and on the shake information obtained through the communication, image blur correction amounts that respectively correspond to partial images included among the plurality of continuous images with use of a method different from a method used by the first image blur correction amount obtainment unit; and an image blur correction unit configured to perform image blur correction with respect to the plurality of continuous images based on image blur correction amounts obtained by the plurality of image blur correction amount obtainment units, wherein at least one of the plurality of image blur correction amount obtainment units obtains the blur correction amounts respectively in correspondence with the plurality of continuous images.

According to a fourth aspect of the present invention, there is provided a control method for an image blur correction apparatus, the control method comprising: obtaining shake information from a plurality of shake detection units configured to detect a shake; calculating an image blur correction amount of a captured image based on the shake information obtained from the plurality of shake detection units; and controlling the obtaining so that shake information from at least one of the plurality of shake detection units is obtained in correspondence with each one of a plurality of continuous captured images, and so that an image for which corresponding shake information from first shake detection unit among the plurality of shake detection units cannot be obtained, and an image for which corresponding shake information from second shake detection unit thereamong cannot be obtained, take place cyclically.

According to a fifth aspect of the present invention, there is provided a control method for an image capturing apparatus having an image capturing sensor that captures a plurality of continuous images on a first cycle, the control method comprising: detecting a shake based on the plurality of images; obtaining a plurality of image blur correction amounts including firstly obtaining, based on shake information obtained from a mounted lens apparatus through communication, image blur correction amounts that respectively correspond to partial images included among the plurality of continuous images, and secondly obtaining, based on a detection result of the shake detection unit and on the shake information obtained through the communication, image blur correction amounts that respectively correspond to partial images included among the plurality of continuous images with use of a method different from a method used by the first image blur correction amount obtainment unit; and performing image blur correction with respect to the plurality of continuous images based on image blur correction amounts obtained by the obtaining, wherein at least one of the plurality of image blur correction amount obtaining obtains the blur correction amounts respectively in correspondence with the plurality of continuous images.

Further features of the present invention will become apparent from the following description of exemplary embodiments with reference to the attached drawings.

BRIEF DESCRIPTION OF THE DRAWINGS

FIGS. 5A and 5B are timing diagrams for describing coordinated communication in which a low-speed processing cycle is set compared to an image capturing cycle.

FIGS. 6A and 6B are timing diagrams for describing motion vector detection in which a low-speed detection cycle is set compared to an image capturing cycle.

FIG. 11 is a flowchart for describing the operations of electronic correction amount conversion in the second embodiment.

DESCRIPTION OF THE EMBODIMENTS

Figure 1:
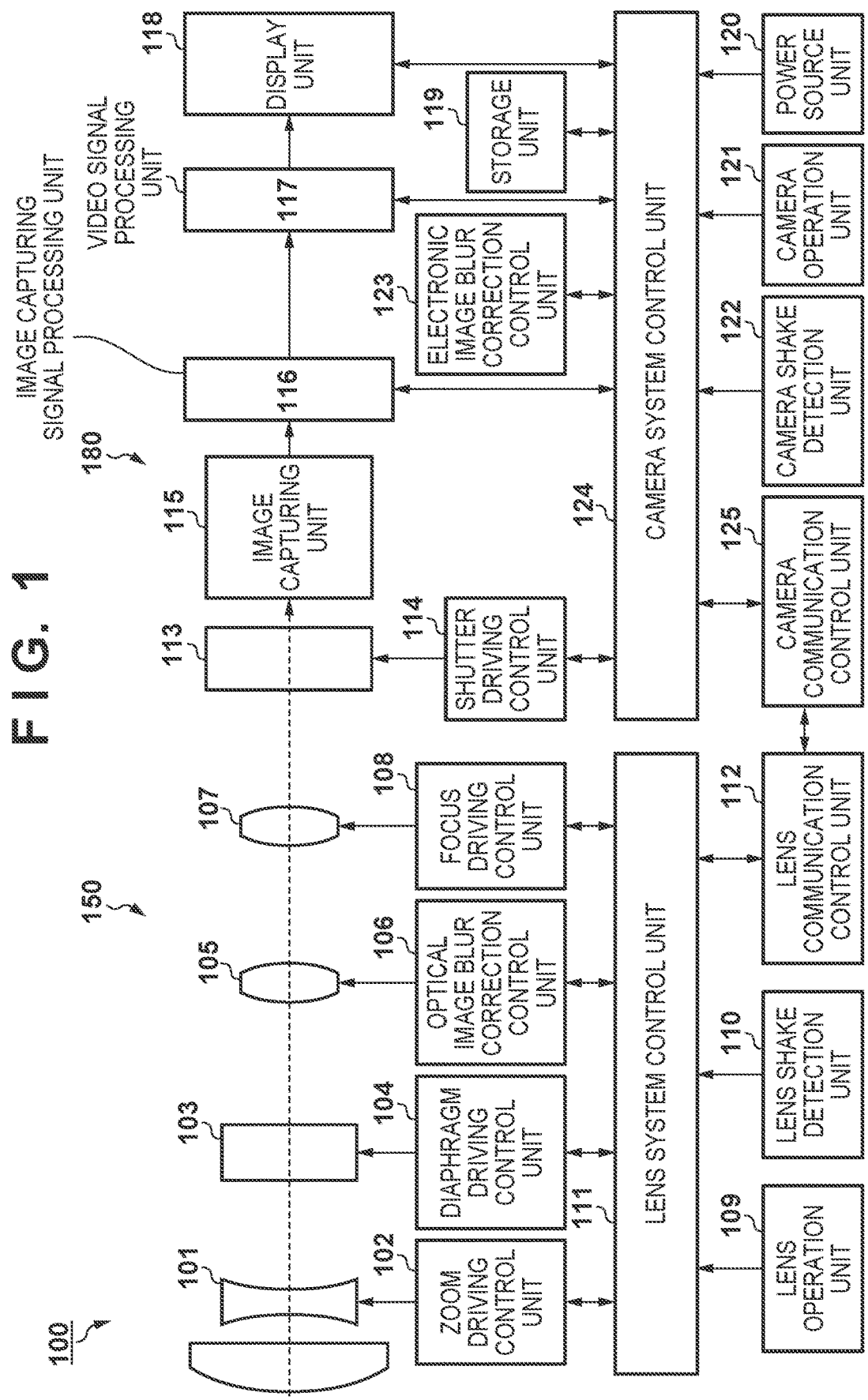
FIG. 1 is a block diagram that schematically shows a configuration of an interchangeable-lens digital camera system, which is an embodiment of an image blur correction apparatus of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Below, a first embodiment of the present invention will be described in detail with reference to the attached drawings; first, the matters that are common to each embodiment will be described.

FIG. 1 is a block diagram that schematically shows a configuration of an interchangeable-lens digital camera system for shooting still images and moving images, which is an embodiment of an image blur correction apparatus of the present invention. Note that the range of application of the present invention is not limited to a digital camera, and the present invention is applicable to various types of image capturing apparatuses.

Note that in the following description of embodiments, vibration of an image capturing apparatus is expressed as a "shake", and the influence of the shake of the image capturing apparatus on a captured image is expressed as "image blur".

In FIG. 1, a digital camera system 100 is composed of an interchangeable lens 150 and a camera main body 180, and the interchangeable lens 150 is used while being attached to the camera main body 180.

A zoom unit 101 of the interchangeable lens 150 includes a zoom lens that changes magnification. A zoom driving control unit 102 controls driving of the zoom unit 101. A diaphragm unit 103 has the functions of a diaphragm. A diaphragm driving control unit 104 controls driving of the diaphragm unit 103. An image blur correction unit 105 includes an image blur correction lens (hereinafter also referred to as a correction lens, or OIS), such as a shift lens. The image blur correction unit 105 is first image blur correction means, and driving thereof is controlled by an optical image blur correction control unit 106. A focus unit 107 includes a focus lens that forms a subject image by performing focus adjustment. A focus driving control unit 108 controls driving of the focus unit 107.

A lens operation unit 109 is an operation unit that is used by a user in operating the interchangeable lens. A lens shake detection unit 110 detects a shake amount of the interchangeable lens 150, and outputs a detected signal to a lens system control unit 111. The lens system control unit (hereinafter referred to as a lens control unit) 111, which controls the entirety of the interchangeable lens 150, includes a CPU (central computational processing apparatus) and integrally controls each driving control unit and correction control unit for the interchangeable lens. The lens control unit 111 communicates with a camera system control unit 124 of the camera main body 180 via a lens communication control unit 112.

Next, the camera main body 180 will be described. The camera main body 180 includes a shutter unit 113. A shutter driving control unit 114 controls driving of the shutter unit 113. An image capturing unit 115 includes an image sensor, and outputs electrical signals by photoelectrically converting an optical image that is formed after passing through the group of lenses. An image capturing signal processing unit 116 performs processing for converting the electrical signals output from the image capturing unit 115 into video signals. A video signal processing unit 117 processes the video signals output from the image capturing signal processing unit 116 in accordance with an intended use. For example, the video signal processing unit 117 changes a cutout position of the video signals in accordance with a correction amount of an electronic image blur correction control unit 123. The electronic image blur correction control unit 123 is second image blur correction means, and controls image blur correction by cutting out images.

A display unit 118 displays images as necessary based on the signals output from the video signal processing unit 117. A storage unit 119 stores various types of data, such as video information. A power source unit 120 supplies a power source to the entire system in accordance with an intended use. A camera operation unit 121 is an operation unit that is used by the user in operating the camera system, and outputs an operation signal to the camera system control unit 124. A camera shake detection unit 122 detects a shake amount of the camera, and outputs a detected signal to the camera system control unit 124. The camera system control unit (hereinafter referred to as a camera control unit) 124 includes a CPU, and integrally controls the entire camera system. The camera control unit 124 communicates with the lens communication control unit 112 of the interchangeable lens 150 via a camera communication control unit 125. That is to say, mutual communication is performed via the lens communication control unit 112 and the camera communication control unit 125 in a state where the interchangeable lens 150 is attached to and electrically connected to the camera main body 180.

Next, a description is given of the general operations of the digital camera system 100 configured in the above-described manner. The lens operation unit 109 and the camera operation unit 121 include an image blur correction switch via which ON/OFF of image blur correction is selectable. Once the user has selected ON for image blur correction by operating the image blur correction switch, the lens control unit 111 or the camera control unit 124 instructs an optical image blur correction control unit 106 or an electronic image blur correction control unit 123 to perform image blur correction operations. Each image blur control unit controls the image blur correction until the issuance of an instruction for turning OFF the image blur correction.

In connection with the image blur correction, the camera operation unit 121 also includes an image blur correction mode switch via which a first mode and a second mode are selectable. The first mode is a mode in which image blur correction is performed by using both of optical image blur correction (first image blur correction) and electronic image blur correction (second image blur correction). When the first mode has been selected, a wider correction angle can be achieved by making a correction through coordination between the optical (optics-based) image blur correction and the electronic (electronic-based) image blur correction. Furthermore, a greater shake can be addressed by reducing the cutout range of the video signals and changing the cutout position in accordance with an image blur correction amount in the video signal processing unit 117.

The camera operation unit 121 includes a release button that is configured in such a manner that a first switch (SW1) and a second switch (SW2) are turned on in order in accordance with a depression amount. The first switch SW1 is turned ON when the user has depressed the release button approximately halfway through, and the second switch SW2 is turned ON when the user has depressed the release button until the end. Once the first switch SW1 has been turned ON, the focus driving control unit 108 performs focus adjustment by driving the focus unit 107, and the diaphragm driving control unit 104 sets an approximate exposure amount by driving the diaphragm unit 103. Once the second switch SW2 has been turned ON, image data obtained from an optical image that has been exposed to light by the image capturing unit 115 is stored into the storage unit 119.

The camera operation unit 121 also includes a moving image recording switch. The camera starts shooting moving images after the moving image recording switch is depressed, and ends the recording when the user presses the moving image recording switch again during the recording. When the user turns ON the first switch SW1 and the second switch SW2 by operating the release button during the shooting of moving images, processing for obtaining and recording a still image during the recording of moving images is executed. The camera operation unit 121 also includes a reproduction mode selection switch via which a reproduction mode is selectable. When the reproduction mode has been selected by operating the reproduction mode selection switch, the camera stops the image blur correction operations.

The camera operation unit 121 also includes means for changing the image capturing frame rate of the camera. The camera can change the image capturing frame rate and select low-speed and high-speed frame rates in accordance with a user operation.

Next, a description is given of image blur correction control that is executed by the lens control unit 111 and the camera control unit 124.

Figure 2:
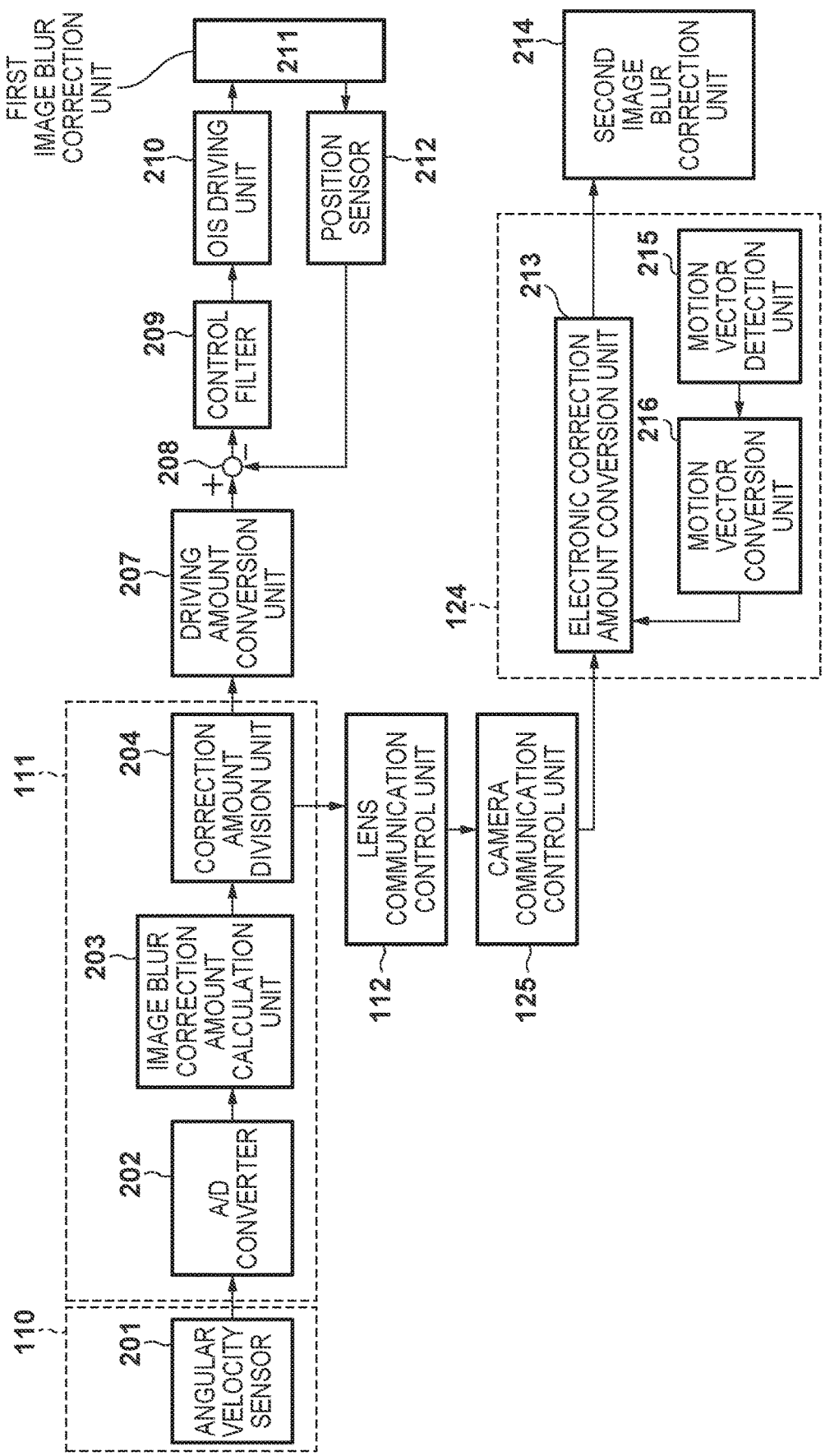
FIG. 2 is a block diagram for describing image blur correction control in a first embodiment.

FIG. 2 is a block diagram for describing control in which image blur correction is performed by driving an optical image blur correction unit (first image blur correction unit 211) and an electronic image blur correction unit (second image blur correction unit 214) based on shake information of the digital camera system 100. In the present embodiment, the first image blur correction unit 211 is driven by calculating a correction amount for image blur correction with use of an angular velocity sensor (first shake detection means), which is provided in the interchangeable lens as shake detection means. At the same time, the second image blur correction unit 214 is driven by transmitting the correction amount for performing image blur correction in the second image blur correction unit 214 from the interchangeable lens 150 to the camera main body 180 via communication. That is to say, the interchangeable lens 150 and the camera main body 180 respectively operate as a master and a slave, forming an image blur correction system. Note that the first image blur correction unit 211 includes the image blur correction unit 105 and the optical image blur correction control unit 106 in FIG. 1. Furthermore, the second image blur correction unit 214 includes the video signal processing unit 117 and the electronic image blur correction control unit 123 in FIG. 1.

An angular velocity sensor 201 in FIG. 2 is included in the lens shake detection unit 110 in FIG. 1, detects the angular velocity of a shake of the digital camera system 100, and outputs a voltage corresponding to this angular velocity. The voltage output from the angular velocity sensor is converted into digital angular velocity data by an A/D converter 202, and supplied to an image blur correction amount calculation unit 203.

The image blur correction amount calculation unit 203 calculates a correction amount for correcting image blur caused by a shake of the digital camera system 100. The digital camera system 100 includes two image blur correction units: the first image blur correction unit 211 and the second image blur correction unit 214. However, as an image blur correction amount calculated by the image blur correction amount calculation unit 203, respective correction amounts of the two image blur correction units are not calculated, but an image blur correction amount of the entire digital camera system 100 is calculated.

Figure 3:
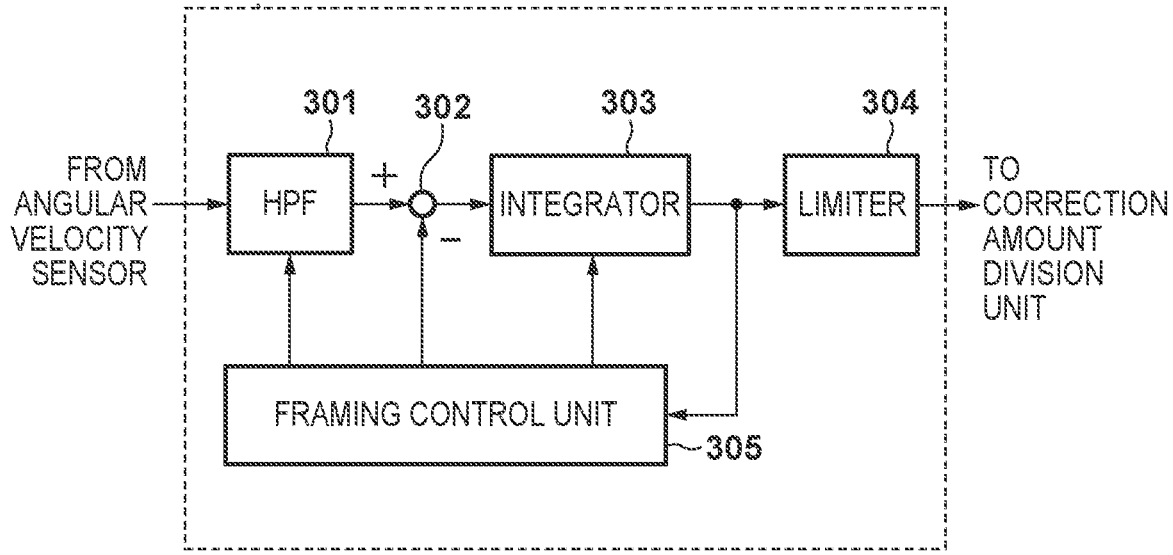
FIG. 3 is a block diagram for describing an image blur correction amount calculation unit in the first embodiment.

FIG. 3 is a block diagram for describing a detailed configuration of the image blur correction amount calculation unit 203. A high-pass filter (hereinafter, HPF) 301 is used to remove DC components or low-frequency components of the angular velocity data detected by the angular velocity sensor 201. The angular velocity data that has passed through the HPF 301 is converted into angular displacement data by performing first-order integration in an integrator 303. Imperfect integration is applied as the computation of integration performed here in order to prevent saturation, and this computation of integration is performed using a commonly known primary low-pass filter (hereinafter, primary LPF).

The angular displacement data calculated by the integrator 303 is supplied to a framing control unit 305 and a limiter 304. The limiter 304 restricts the angular displacement data so that the first image blur correction unit 211 and the second image blur correction unit 214 do not reach the edges of the movable ranges. The angular displacement data restricted by the limiter 304 is output as an output from the image blur correction amount calculation unit 203, that is to say, an image blur correction amount of a captured image. Note that the image blur correction amount (angular displacement data) calculated by the image blur correction amount calculation unit 203 is the value of the sum of the correction amounts of the first image blur correction unit 211 and the second image blur correction unit 214. Therefore, a displacement amount obtained by adding the control range of the first image blur correction unit 211 and the control range of the second image blur correction unit 214 is set as a limit value of the limiter 304.

The framing control unit 305 determines whether an operation intended by the user, such as panning and tilting, has been performed, and performs control so as to return the angular displacement data to the center. In other words, shake components attributed to camera framing intended by the user are removed from the angular velocity data or the angular displacement data detected by the angular velocity sensor 201, and control to correct image blur caused by a camera shake is performed while carrying out the intended framing.

Specifically, predetermined thresholds are set inside the control edges of the angular displacement data set in the limiter 304, and it is determined that panning has been performed when the angular displacement data output from the integrator 303 has exceeded these thresholds. When it is determined that panning has been performed, the angular velocity data is restricted by removing more low-frequency components by increasing the cutoff frequency of the HPF 301. Alternatively, an offset is subtracted from the angular velocity data input to the integrator 303 so as to return the output from the integrator 303 to the center. Alternatively, control is performed so as to return the output from the integrator 303 to the center by increasing the cutoff frequency of the LPF computation performed in the integrator 303. By performing control in the foregoing manner, the image blur correction operations can be controlled so as to fall within the movable ranges of the first image blur correction unit 211 and the second image blur correction unit 214, even in a case where a shake intended by the user, such as panning and tilting, has occurred.

A correction amount division unit 204 in FIG. 2 divides the image blur correction amount of the entire system calculated by the image blur correction amount calculation unit 203 into a first correction amount intended for correction in the first image blur correction unit 211 and a second correction amount intended for correction in the second image blur correction unit 214.

Figure 4A:
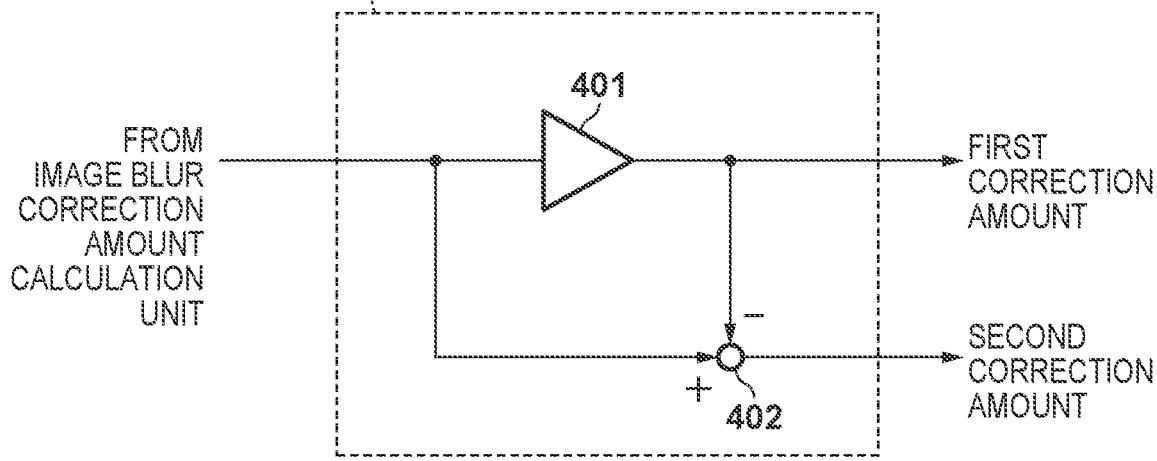
FIGS. 4A and 4B are block diagrams for describing a correction amount division unit in the first embodiment.
Figure 4B:
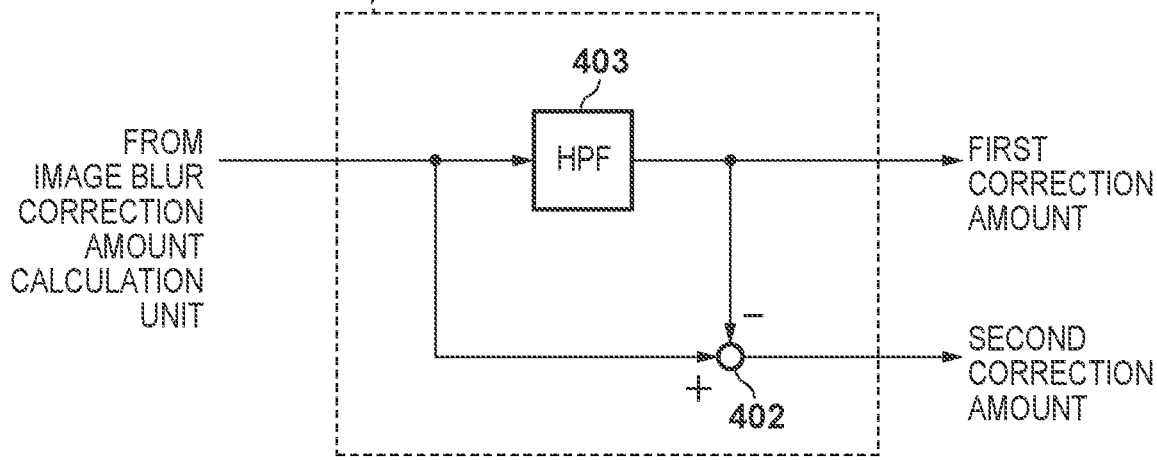

FIGS. 4A and 4B are diagrams showing exemplary configurations of the correction amount division unit 204. In FIG. 4A, a multiplier 401 outputs the first correction amount by multiplying the image blur correction amount calculated in the image blur correction amount calculation unit 203 by a predetermined scale factor K1. Here, a scale factor that satisfies the following is set as K1.

$$0 \leq K1 \leq 1 \quad \text{(Expression 1)}$$

After the multiplication by the predetermined scale factor K1 in the multiplier 401, the image blur correction amount serves as a correction amount that is used in performing image blur correction in the first image blur correction unit 211. Also, a subtractor 402 subtracts the first correction amount from the image blur correction amount calculated in the image blur correction amount calculation unit 203, thereby calculating the second correction amount that is used in performing image blur correction in the second image blur correction unit 214. As a result of performing the above-described calculation, the correction amount can be divided in such a manner that adding the first correction amount and the second correction amount yields the image blur correction amount of the entire system.

Note that although FIG. 4A shows an example in which the image blur correction amount is divided by a predetermined percentage, the image blur correction amount may be divided by a frequency band. FIG. 4B shows an exemplary configuration of the correction amount division unit 204 for a case where the image blur correction amount is divided by a frequency band. A high-pass filter (hereinafter, HPF) 403 allows only a high-frequency band of the image blur correction amount calculated in the image blur correction amount calculation unit 203 to pass therethrough, and outputs the same as the first correction amount. The second correction amount is obtained by extracting a low-frequency band through subtraction of the first correction amount (high-frequency band) from the image blur correction amount calculated in the image blur correction amount calculation unit 203.

Returning to FIG. 2, a driving amount conversion unit 207 converts the first correction amount into a movement amount for appropriately performing image blur correction in the first image blur correction unit 211, and outputs the movement amount as a driving target position. A position sensor 212 detects position information of the first image blur correction unit 211, and a subtractor 208 obtains a deviation by subtracting the position information of the first image blur correction unit 211 from the driving target position. The deviation is input to a control filter 209, undergoes various types of signal processing, such as gain amplification and phase compensation, and is supplied to an OIS driving unit 210. The first image blur correction unit 211 is driven by the OIS driving unit 210; as a result, a correction optical system moves in the direction perpendicular to the optical axis. This leads to the formation of a feedback loop whereby position information of the moved first image blur correction unit 211 is detected by the position sensor 212 again and the next deviation data is calculated, and control is performed so as to reduce the difference between the driving target position and the position information. As a result, the correction optical system is driven so as to follow the driving target position.

The second correction amount calculated in the correction division unit 204 is transmitted to the camera main body 180 via the lens communication control unit 112 and the camera communication control unit 125. An electronic correction amount conversion unit 213 adds a motion vector correction amount obtained from a motion vector conversion unit 216 to the correction amount received from the camera communication control unit 125, and outputs the result of the addition as a cutout target position. Based on the images included in the video signals from the image capturing signal processing unit 116, a motion vector detection unit (second shake detection means) 215 detects motion vectors in two directions, that is to say, the horizontal direction and the vertical direction that are perpendicular to each other on a planar surface that is perpendicular to the optical axis.

Specifically, examples of a motion vector detection method include a correlation method and a block matching method. Here, it is assumed that the motion vector detection unit 215 adopts the block matching method as one example thereof. In this block matching method, first, an input image signal is divided into a plurality of blocks of an appropriate size (e.g., 16×16 pixels), and the differences from pixels in a certain range in the previous field or frame is calculated on a per-block basis. Then, the method searches the previous field or frame for a block with the smallest sum of absolute values of such differences, and detects a relative shift of this block as motion vectors of this block (a differential shake detection method). As a result, movement amounts (i.e., motion vectors) in the vertical direction and the horizontal direction are obtained on a per-pixel basis. These motion vectors indicate a movement amount of continuous captured images per unit time, that is to say, a movement amount of the image capturing apparatus. Also, in a case where motion vectors cannot be detected well, it is judged that a motion vector error has occurred. One possible example of a method of determining a motion vector error uses such conditions as a low luminance signal, a detected value being a peak value, and so forth.

The motion vector conversion unit 216 sets a rotation axis Y in the vertical direction (Yaw axis) and a rotation axis X in the horizontal direction (Pitch axis) so that they represent axes that are perpendicular to each other on a planar surface that is perpendicular to the optical axis. Then, a Yaw angle and a Pitch angle, which are rotation angles about their respective axes, are converted using the motion vectors output from the motion vector detection unit 215 and the focal length. Note that the motion vector conversion unit 216 adds up the differences between the motion vectors obtained from the motion vector detection unit 215 and a previous electronic correction amount, and outputs the result of the addition to the electronic correction amount conversion unit 213. The second image blur correction unit 214 cuts out an image in the direction perpendicular to the optical axis in accordance with the cutout position designated by the electronic correction amount conversion unit 213.

In the above-described manner, the first image blur correction unit 211 and the second image blur correction unit 214 operate in coordination with each other so as to share correction of a shake of the entire system; therefore, the correction range of image blur correction can be expanded.

A description is now given of the influence of an increase in a processing load and the like, which is a problem addressed by the present invention, on communication between the interchangeable lens 150 and the camera main body 180.

The occurrence of the aforementioned increase in the processing load is caused by the execution of, for example, image capturing and development processing at a high-speed frame rate. In a case where images are captured at a high-speed frame rate, the frequency of communication between the interchangeable lens 150 and the camera main body 180 increases. Examples include autofocus control, diaphragm control, zoom control, and the like, and communication at the time of coordinated operations in the above-described image blur correction (hereinafter referred to as coordinated communication) is not an exception.

There are limitations to processing capabilities of the CPUs of the interchangeable lens 150 and the camera main body 180, and there are cases where the cycle of coordinated communication needs to be reduced to satisfy, for example, image capturing and development processing at a high-speed frame rate. In such cases, continuous correction amounts cannot be obtained, which causes a reduction in the image blur correction effects. FIG. 5A shows a relationship between image capturing timings and coordinated communication timings, and FIG. 5B shows a relationship between image capturing timings and coordinated communication timings for a case where coordinated communication has a low-speed cycle. As shown in FIG. 5B, if there is a frame for which a shake amount cannot be cyclically obtained, as with a frame (Frame2) shot between Frame1 and Frame3, continuous correction amounts cannot be calculated.

Also, in addition to the aforementioned reduction in a processing load through a reduction in the speed of the cycle of coordinated communication, there are cases where a low-speed detection cycle needs to be set for motion vectors to satisfy, for example, image capturing and development processing at a high-speed frame rate. In such cases, similarly, continuous correction amounts cannot be calculated, which similarly causes a reduction in the image blur correction effects. FIG. 6A shows a relationship between image capturing timings and motion vector detection timings, and FIG. 6B shows a relationship between image capturing timings and motion vector detection timings for a case where motion vector detection has a low-speed cycle. As shown in FIG. 6B, there is a frame for which a shake amount cannot be obtained, as with a frame (Frame2) shot between Frame1 and Frame3, and continuous correction amounts cannot be calculated.

Furthermore, there is a difference between a shake information detection section (period) obtained through coordinated communication performed in FIG. 5B and a shake information detection section (period) obtained in a case where the speed of the cycle of motion vector detection performed in FIG. 6B is reduced, and motion vectors obtained in FIG. 6B represent pieces of shake information corresponding to two frames. That is to say, a shake amount (motion vectors) corresponding to Frame3 is the difference between Frame1 and Frame3.

Figure 7A:
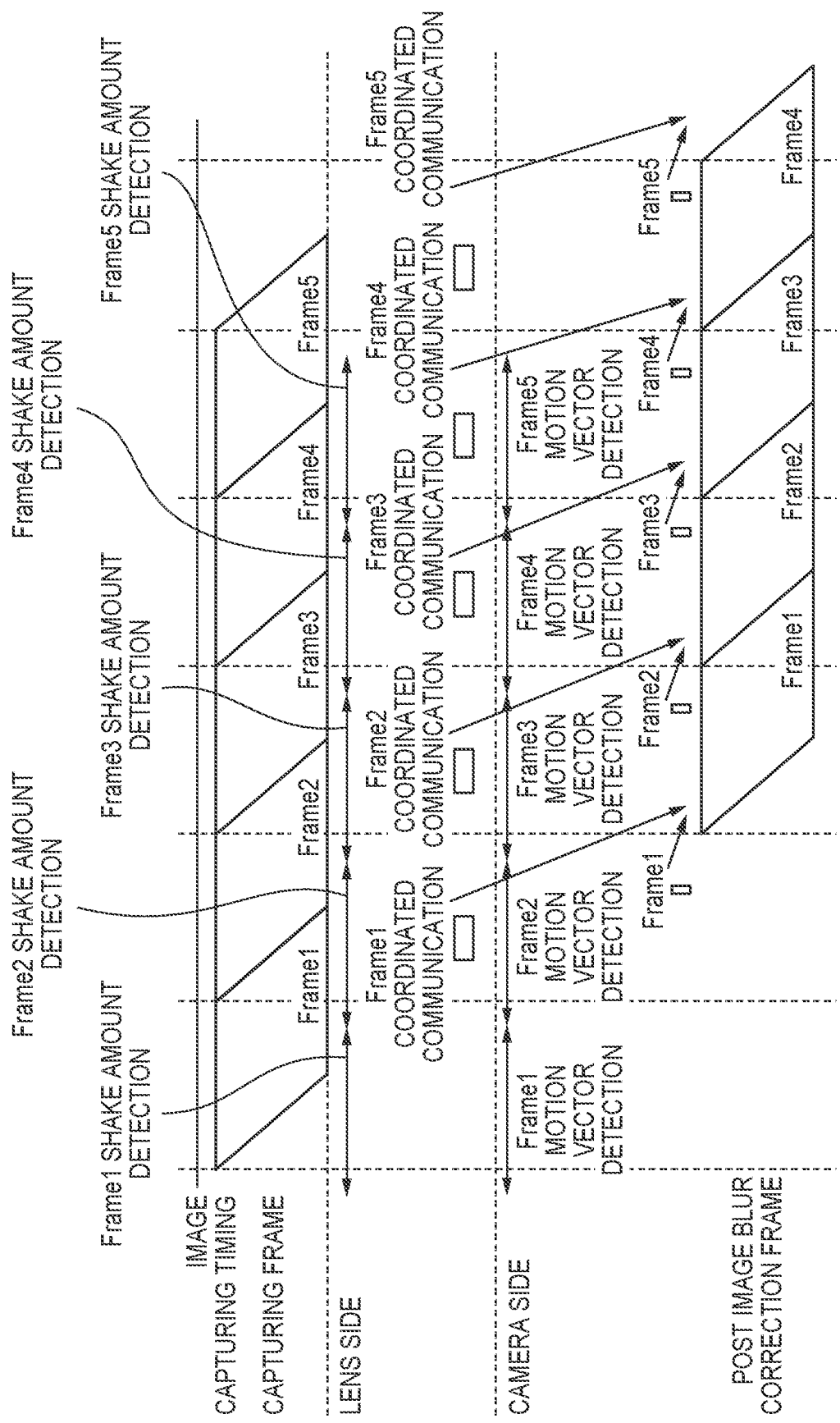
FIGS. 7A and 7B are timing diagrams for describing a problem with a case where a low speed is set for coordinated communication and a low-speed cycle is set for motion vector detection compared to an image capturing cycle.
Figure 7B:
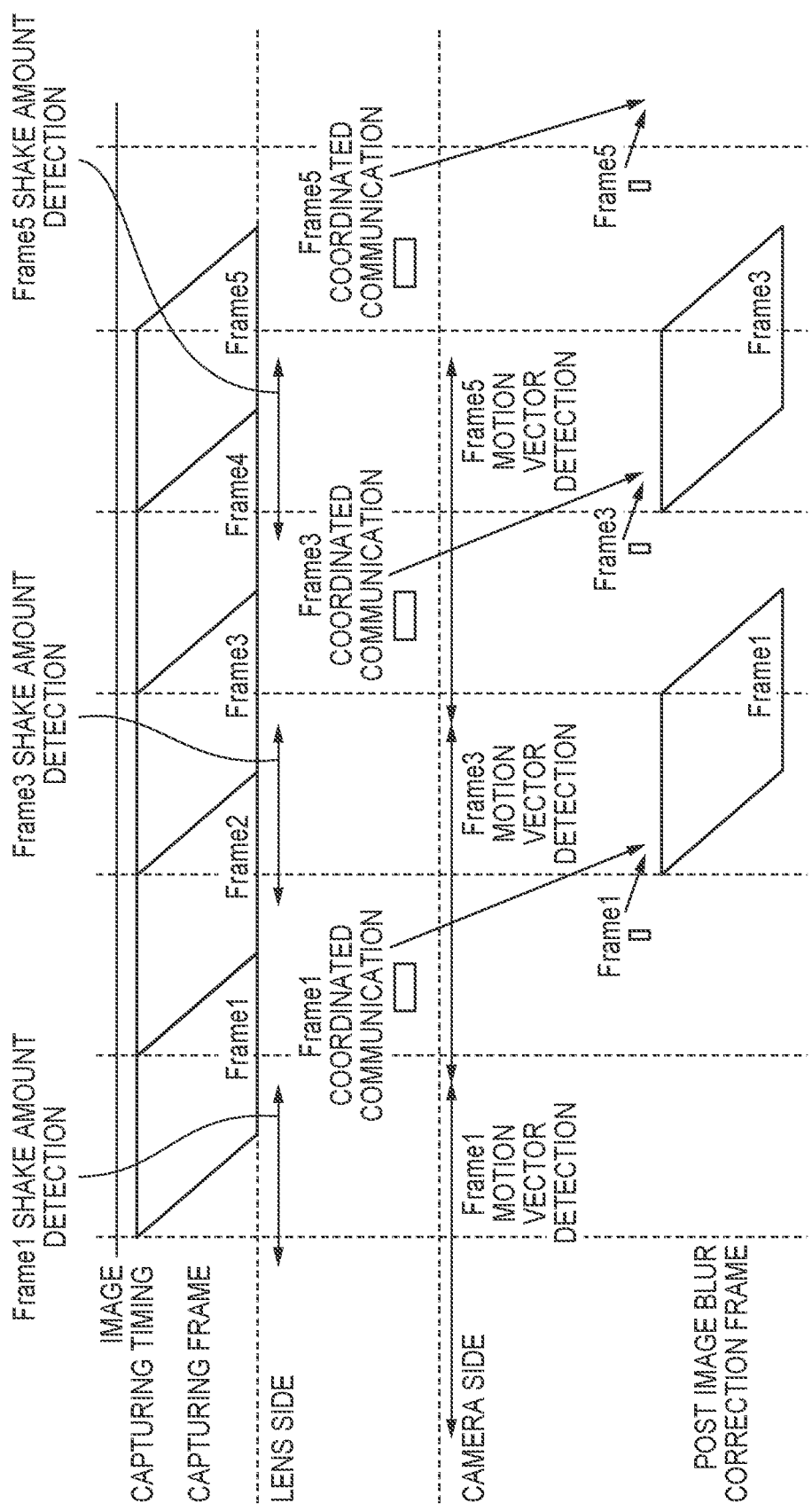

As a method of performing image blur correction with use of the aforementioned two pieces of shake information, FIG. 7A shows a relationship among image capturing, coordinated communication, and motion vector detection for an ideal case, and FIG. 7B shows a relationship among image capturing, coordinated communication, and motion vector detection for a case where the image blur correction effects are reduced. In a case where a processing load on the CPUs of the interchangeable lens 150 and the camera main body 180 is large, control is performed as shown in FIG. 7B, and continuous image blur correction amounts cannot be calculated.

In view of this, in the present embodiment, a reduction in the image blur correction effects is prevented by generating continuous correction amounts through an appropriate combination of the aforementioned case of the low-speed coordinated communication and the aforementioned case of the low-speed detection cycle of motion vectors.

Figure 8:
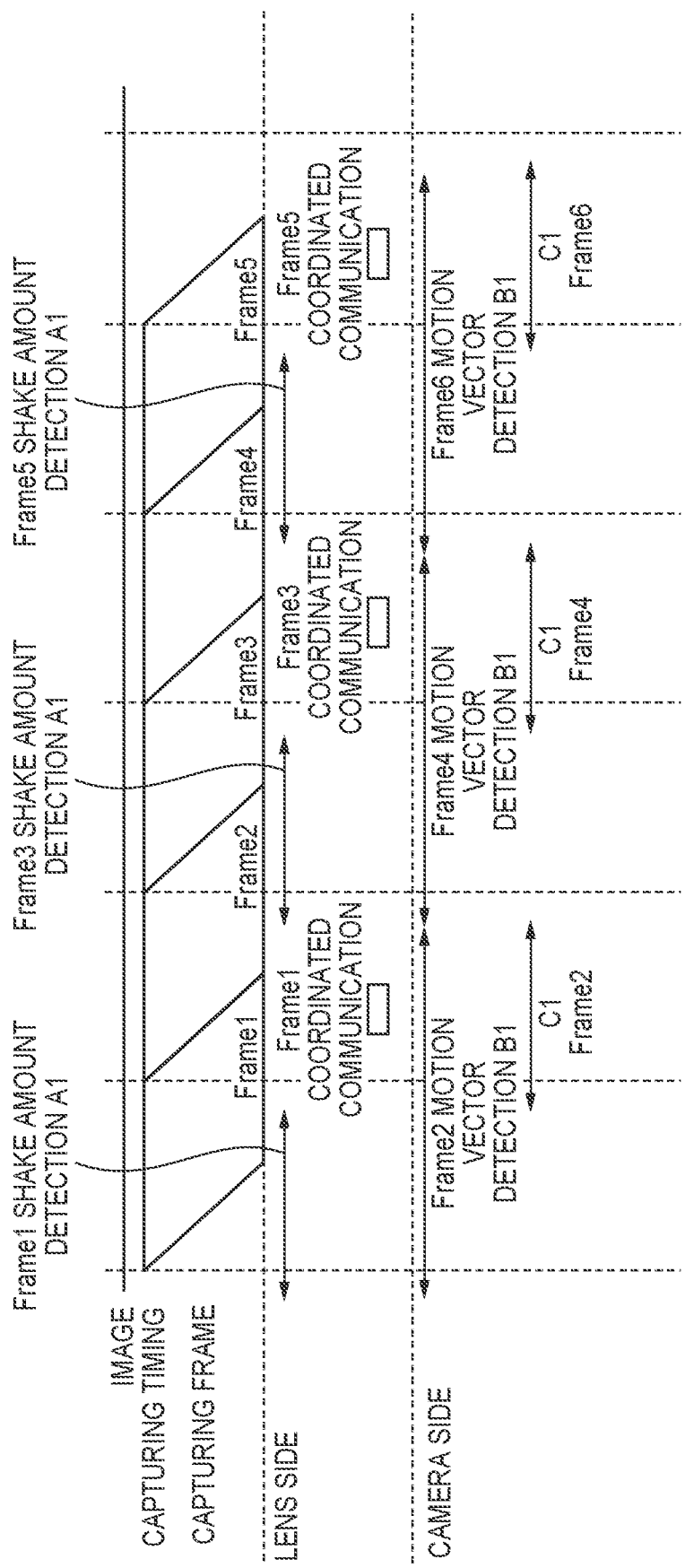
FIG. 8 is a timing diagram for describing the operations of electronic correction amount conversion in the first embodiment.

FIG. 8 is a diagram showing a relationship among image capturing timings, the obtainment of image blur correction amounts through coordinated communication with a low-speed cycle, and the obtainment of image blur correction amounts based on motion vectors with a low-speed detection cycle for a case where image blur correction is performed while suppressing a reduction in the image blur correction effects in the electronic correction amount conversion unit 213. In FIG. 8, a shake of a frame that cannot be obtained in FIG. 7B can be calculated by shifting a period in which a shake obtained through coordinated communication and a shake detected using motion vectors overlap. A shift between the timing of obtainment of a shake through coordinated communication and the timing of obtainment of a shake detected using motion vectors is constant. That is to say, for the previous frame, an image blur correction amount is calculated in accordance with a shake amount obtained through coordinated communication, and for the next frame, an image blur correction amount is calculated by subtracting the image blur correction amount calculated for the previous frame from motion vectors corresponding to two detected frames. In this way, continuous correction amounts can be calculated. That is to say, for one frame, image blur correction is performed using an output from the angular velocity sensor 201 obtained through coordinated communication, and for the next frame (an image that is, or comes after, the next image for which shake information was obtained through coordinated communication), image blur correction is performed using an image blur correction amount calculated based on motion vectors. These are performed alternatingly on a per-frame basis. In other words, while a frame for which shake information is not obtained from the angular velocity sensor (Frame2, 4) and a frame for which shake information is not obtained from motion vectors (Frame 1, 3, 5) take place alternatingly, timings are controlled so that one of these types of shake information can be obtained for every frame.

Figure 9:
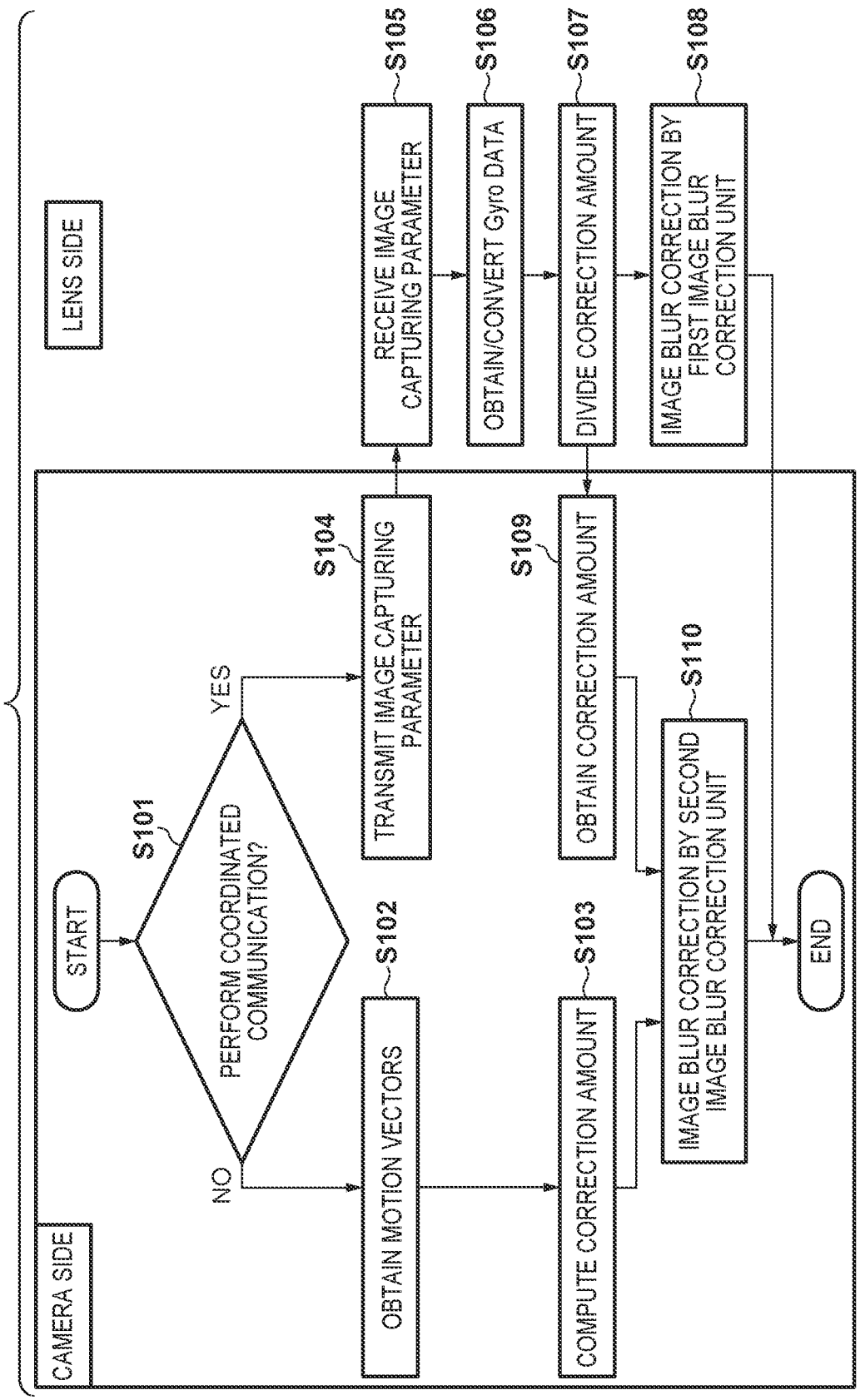
FIG. 9 is a flowchart for describing the operations of electronic correction amount conversion in the first embodiment.

The following describes one example of an image blur correction amount calculation method with reference to FIG. 8 and the flowchart of FIG. 9. Note that the processing shown in FIG. 9 is executed repeatedly on an arbitrary predetermined cycle, such as an image capturing cycle; in the present embodiment, it is assumed that the image capturing cycle is used.

First, in step S101, the camera control unit 124 determines whether to reduce the speed of the cycle of coordinated communication. In the present embodiment, whether to perform coordinated communication in accordance with a processing load on a per-frame basis is determined. In the case of a frame for which it is determined that coordinated communication is not to be performed, processing proceeds to step S102; in the case of a frame for which it is determined that coordinated communication is to be performed, processing proceeds to step S104. Note that in the present embodiment, it is assumed that a frame for which coordinated communication is performed and a frame for which coordinated communication is not performed are arranged alternatingly.

A description is now given of the case where it is determined that coordinated communication is not to be performed in step S101. In step S102, motion vectors are obtained, and processing proceeds to step S103. Here, as step S102 that was previously executed precedes the current step by two frames, motion vectors B1 corresponding to two frames can be obtained. In step S103, as indicated by (Expression 2), an image blur correction amount C1 is calculated by calculating the difference between the difference between a correction amount A1 that was calculated in step S109 one frame before and a previous image blur correction amount C1_old and a motion vector B1 obtained in step S102, and by integrating the calculated difference.

$$C1=f(B1-(A1-C1\_old))\quad\text{(Expression 2)}$$

The calculated image blur correction amount C1 is restricted so as to fall within the range that can be corrected by the second image blur correction unit 214, and a correction amount to which panning processing and the like have been applied is calculated; then, processing proceeds to step S110.

Next, a description is given of the case where it is determined that coordinated communication is to be performed in step S101. In step S104, the camera control unit 124 transmits image capturing information, such as limiter information to which image blur correction can be applied in the second image blur correction unit 214, a shutter speed, and an exposure period, from the camera main body 180 to the interchangeable lens 150, and processing proceeds to step S105. In step S105, the data transmitted from the camera main body 180 is received by the lens control unit 111, and processing proceeds to step S106.

In step S106, the lens control unit 111 detects a shake of the camera relative to the Yaw and Pitch axes with use of the angular velocity sensor 201 in FIG. 2. Note that as shake information from the angular velocity sensor 201 is an angular velocity, the HPF is applied thereto in order to remove low-frequency components, the angular velocity is converted into angular displacement data in the integrator, and processing proceeds to step S107.

In step S107, the lens control unit 111 generates an image blur correction amount used in the first image blur correction unit 211 and the second image blur correction unit 214, and divides the image blur correction amount. In the present embodiment, as an image blur correction amount calculation method, the correction amount is calculated within a range that represents the sum of the ranges in which the first image blur correction unit 211 and the second image blur correction unit 214 can perform correction; also, as one example of a division method, the correction amount is divided in accordance with the percentages of the respective correction ranges. In a case where image blur correction is performed using the calculated and divided correction amount that is used in the first image blur correction unit 211, processing proceeds to step S108. Also, in a case where image blur correction is performed using the calculated and divided correction amount that is used in the second image blur correction unit 214, the correction amount is transmitted from the interchangeable lens 150 to the camera main body 180, and processing proceeds to step S109.

In step S108, the lens control unit 111 performs image blur correction by controlling the first image blur correction unit 211 with use of the correction amount calculated in step S107.

In step S109, the camera control unit 124 receives the data that has been transmitted from the interchangeable lens 150 to the camera main body 180, and processing proceeds to step S110. In step S110, the camera control unit 111 performs image blur correction by controlling the second image blur correction unit 214 with use of the correction amount that was calculated and obtained in step S103 or step S109.

Note that the above description of the embodiment has been provided in relation to the case where image blur correction is performed using both of the first image blur correction unit 211 and the second image blur correction unit 214. However, as long as the camera main body 180 can receive a shake amount detected on the interchangeable lens 150 side in step S107 and step S109 of FIG. 9, image blur correction may not be performed by the first image blur correction unit 211 on the interchangeable lens 150, and image blur correction may be performed only by the second image blur correction unit 210.

As described above, according to the present embodiment, continuous image blur correction amounts can be calculated even in a case where coordinated communication and the detection cycle of shake information, such as motion vectors, have been reduced for the purpose of reducing a processing load. In this way, a reduction in the image blur correction effects can be suppressed, and appropriate image blur correction can be performed. That is to say, even at the time of high-load processing that uses, for example, a high-speed frame rate, appropriate image blur correction control can be realized through coordination between the camera and the lens.

Second Embodiment

Figure 10:
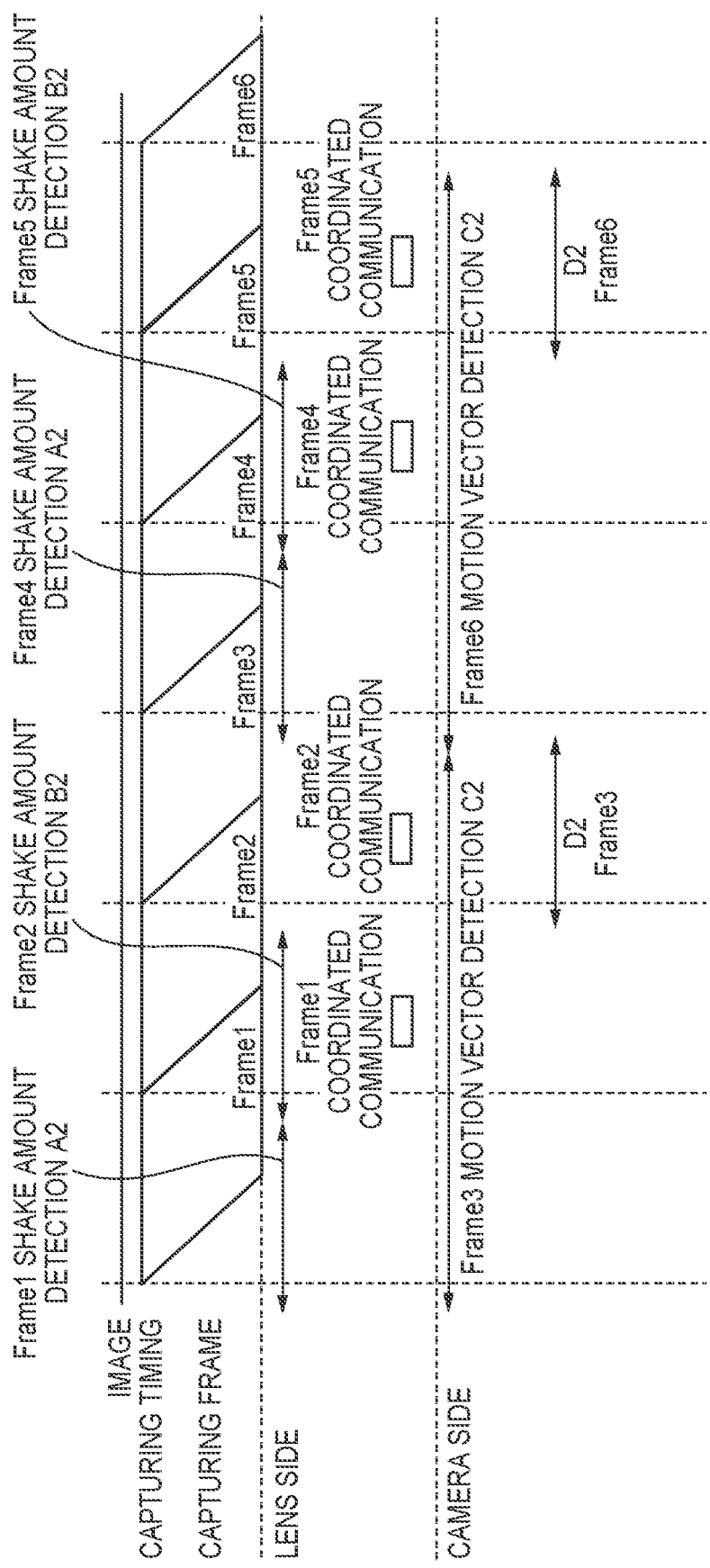
FIG. 10 is a timing diagram for describing the operations of electronic correction amount conversion in a second embodiment.

FIG. 10 is a diagram showing the processing of the electronic correction amount conversion unit 213 that is different from the first embodiment; it is a diagram showing a relationship among image capturing timings, the obtainment of image blur correction amounts through coordinated communication with a reduced communication cycle, and the obtainment of image blur correction amounts through motion vector detection with a reduced detection cycle.

In the first embodiment, processing is performed in units of two frames, namely the previous frame and the next frame; that is to say, processing for coordinated communication and motion vector detection is performed once every two frames. In the present embodiment, processing is performed in units of three frames; that is to say, the frequency of coordinated communication is twice every three frames, and the frequency of motion vector detection is once every three frames. In this case, the cycle of detection of a shake through coordinated communication becomes longer than the image capturing cycle of frames (the frequency of detection of a shake through coordinated communication becomes lower than the frequency of image capturing for frame images). In this way, a processing load associated with motion vector detection can be reduced compared to the first embodiment while reducing a processing load associated with coordinated communication.

The following describes one example of an image blur correction amount calculation method with reference to FIG. 10 and the flowchart of FIG. 11. Note that the constituents that are similar to those in FIG. 9 are given the same reference signs thereas, and a description thereof is omitted. The processing shown in FIG. 11 is executed repeatedly in an arbitrary predetermined cycle, such as an image capturing cycle; in the present embodiment, it is assumed that the image capturing cycle is used.

First, in step S201, the camera control unit 124 determines whether coordinated communication has been executed consecutively for two frames. When it is determined that coordinated communication has been executed consecutively for two frames or less, processing proceeds to step S104; when it is determined that coordinated communication has been executed consecutively for two frames or more, processing proceeds to step S202.

In step S202, the camera control unit 214 obtains motion vectors, and processing proceeds to step S203. Here, as step S202 that was previously executed precedes the current step by three frames, motion vectors C2 corresponding to three frames can be obtained. In step S203, as indicated by (Expression 3), an image blur correction amount D2 is calculated by calculating the difference between the correction amounts A2 and B2 that were calculated in step S109 one frame before and two frames before, the difference from the previous image blur correction amount D2_old, and the difference from the motion vector C2 obtained in step S202, and by performing integration.

$$D2 = f(C2 - ((B2 - A2) + (A2 - D2\_old))) \quad \text{(Expression 3)}$$

The calculated image blur correction amount D2 is restricted so as to fall within the range that can be corrected by the second image blur correction unit 214, and a correction amount to which panning processing and the like have been applied is calculated; then, processing proceeds to step S110.

As described above, according to the present embodiment, continuous image blur correction amounts can be calculated even in a case where coordinated communication and the detection cycle of shake information, such as motion vectors, have been reduced unevenly for the purpose of reducing a processing load. In this way, appropriate image blur correction can be performed while suppressing a reduction in the image blur correction effects. That is to say, even at the time of high-load processing that uses, for example, a high-speed frame rate, appropriate image blur correction control can be realized through coordination between the camera and the lens.

In the first embodiment, the camera control unit 214 controls the obtainment of shake information in such a manner that a frame for which shake information is obtained through coordinated communication and a frame for which shake information is obtained based on motion vectors take place alternatingly. Also, in the present embodiment, the obtainment of shake information is controlled in such a manner that, after a frame for which shake information is obtained through coordinated communication takes place twice consecutively, a frame for which shake information is obtained based on motion vectors takes place once. The method of shifting the two timings is not limited to the foregoing methods, as long as control is performed in such a manner that a shift between the timing of obtainment of shake information through coordinated communication and the timing of obtainment of shake information based on motion vectors is constant so that continuous correction amounts can be obtained. In order to make the shift between the two timings constant, it is sufficient that the obtainment cycle of shake information based on coordinated communication match the obtainment cycle of shake information based on motion vectors. Note that the obtainment cycle of shake information denotes a cycle involving a frame for which shake information is obtained and a frame for which shake information is not obtained. For example, in a case where a frame for which shake information is not obtained through coordinated communication takes place once after a frame for which shake information is obtained through coordinated communication takes place twice consecutively, and this is repeated a plurality of times as in the present embodiment, the obtainment cycle of shake information based on coordinated communication is three frames. Similarly, in a case where a frame for which shake information based on motion vectors is obtained takes place once after a frame for which shake information based on motion vectors is not obtained takes place twice consecutively, and this is repeated a plurality of times, the obtainment cycle of shake information based on motion vectors is three frames. Also, although only one of shake information based on coordinated communication and shake information based on motion vectors is obtained in correspondence with each frame in the first and present embodiments, there may be a frame for which both types of shake information are obtained. In terms of a processing load, the mode with a frame for which both types of shake information are obtained is more disadvantageous; however, for example, as there could possibly be a timing at which shake information based on coordinated communication and shake information based on motion vectors become necessary in operations other than shake correction, there may accordingly be a timing at which both types of shake information are obtained.

Note that although the above description of each embodiment has been provided in relation to a case where an angular velocity sensor is used as one example of shake detection means, another shake detection means may also be used. For example, a shake amount may be calculated from acceleration with use of an acceleration sensor, and a shake amount of the camera system may be calculated by detecting a shake with use of a combination of a plurality of sensors.

Also, the above has described a lens shift method whereby some of the lenses that constitute the interchangeable lens is moved in the direction perpendicular to the optical axis, and image cutout whereby a captured image is moved in the direction perpendicular to the optical axis, as examples of image blur correction means. However, it is permissible to use a method of correcting image blur by using, for example, image sensor shifting whereby the image sensor is moved in the direction perpendicular to the optical axis.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-147675, filed Sep. 2, 2020, which is hereby incorporated by reference herein in its entirety.

What is claimed is:

1. An image blur correction apparatus, comprising:
at least one processor and/or circuit configured to function as following units:
an obtainment unit configured to obtain shake information from a plurality of shake detection units configured to detect a shake;
a plurality of image blur correction amount calculation units including
a first image blur correction amount calculation unit configured to calculate, based on shake information from first shake detection unit that has been obtained by the obtainment unit, image blur correction amounts that respectively correspond to partial images included among a plurality of continuous images, and
a second image blur correction amount calculation unit configured to calculate, based on shake information from second shake detection unit that has been obtained by the obtainment unit, image blur correction amounts that respectively correspond to partial images included among the plurality of continuous images with use of a method different from a method used by the first image blur correction amount calculation unit; and
control unit configured to control the plurality of image blur correction amount calculation units so that at least one of the plurality of image blur correction amount calculation units obtains the image blur correction amounts respectively in correspondence with a plurality of continuous captured images, and so that an image for which an image blur correction amount is calculated by the first image blur correction amount calculation unit among the plurality of image blur correction amount calculation units, and an image for which an image blur correction amount is calculated by the second image blur correction amount calculation unit among the plurality of image blur correction amount calculation units, take place cyclically.

2. The image blur correction apparatus according to claim 1, wherein
the obtainment unit obtains the shake information from the first shake detection unit through communication.

3. The image blur correction apparatus according to claim 1, wherein the at least one processor and/or circuit further function as
an image blur correction control unit configured to control correction of image blur of a captured image based on image blur correction amounts calculated by the plurality of image blur correction amount calculation units.

4. The image blur correction apparatus according to claim 3, wherein
the image blur correction control unit controls electronic image blur correction that electronically corrects image blur of the plurality of continuous captured images.

5. The image blur correction apparatus according to claim 4, wherein
the image blur correction control unit further controls correction device for optically correcting the image blur of the captured image.

6. The image blur correction apparatus according to claim 1, wherein
the second shake detection unit is differential shake detection unit configured to detect a shake from differences among the plurality of continuous captured images.

7. The image blur correction apparatus according to claim 6, wherein
the second shake detection unit obtains the differences based on an image for which a corresponding image blur correction amount cannot be obtained by at least the first image blur correction amount calculation unit.

8. The image blur correction apparatus according to claim 1, wherein
the obtainment unit obtains the shake information from the first shake detection unit on a second cycle that is longer than a first cycle on which the plurality of continuous images are captured.

9. The image blur correction apparatus according to claim 1, wherein
the obtainment unit obtains the shake information from the second shake detection unit on a third cycle that is longer than a first cycle on which the plurality of continuous images are captured.

10. The image blur correction apparatus according to claim 1, wherein
the control unit controls the plurality of image blur correction amount calculation units so that a cycle involving an image for which a corresponding image blur correction amount is calculated by the first image blur correction amount calculation unit and an image for which a corresponding image blur correction amount is not calculated thereby matches a cycle involving an image for which a corresponding image blur correction amount is calculated by the second image blur correction amount calculation unit and an image for which a corresponding image blur correction amount is not calculated thereby.

11. The image blur correction apparatus according to claim 10, wherein
the plurality of image blur correction amount calculation units are composed of two image blur correction amount calculation unit represented by the first image blur correction amount calculation unit and the second image blur correction amount calculation unit, and
the control unit controls the plurality of image blur correction amount calculation units so that an image for which an image blur correction amount is calculated by the first image blur correction amount calculation unit and an image for which an image blur correction amount is calculated by the second image blur correction amount calculation unit take place alternatingly.

12. The image blur correction apparatus according to claim 1, wherein
the second shake detection unit is differential shake detection unit for detecting a shake from differences among the plurality of continuous captured images, and
the second image blur correction amount calculation unit calculates an image blur correction amount corresponding to a first image for which corresponding shake information from the first shake detection unit cannot be obtained based on shake information which is from the second shake detection unit and which is based on a difference between the first image and a second image, and on shake information which is from the first shake detection unit and which corresponds to a third image shot between the first image and the second image.

13. The image blur correction apparatus according to claim 12, wherein
the third image is an image shot before the first image.

14. The image blur correction apparatus according to claim 1, wherein
in a case where a first cycle on which the plurality of continuous images are captured is shorter than a predetermined value, the control unit controls the plurality of image blur correction amount calculation units so that at least one of the plurality of image blur correction amount calculation units calculates the image blur correction amounts respectively in correspondence with the plurality of continuous captured images.

15. An image capturing apparatus, comprising:
an image capturing device that capture the plurality of continuous images;
the image blur correction apparatus according to claim 1; and
the second shake detection unit; and
an image blur correction unit configured to perform image blur correction with respect to the plurality of continuous images based on image blur correction amounts obtained by the plurality of image blur correction amount calculation units,
wherein the obtainment unit obtains a detection result of the first shake detection unit included in a mounted lens apparatus through communication on a second cycle that is longer than a first cycle on which the plurality of continuous images are captured.

16. The image capturing apparatus according to claim 15, wherein
the first image blur correction amount calculation unit calculates the image blur correction amounts on the second cycle.

17. An image capturing apparatus, comprising:
an image capturing sensor that captures a plurality of continuous images on a first cycle; and
at least one processor and/or circuit configured to function as following units:
a shake detection unit configured to detect a shake based on the plurality of continuous images;
a plurality of image blur correction amount obtainment units including a first image blur correction amount obtainment unit configured to obtain, based on shake information obtained from a mounted lens apparatus through communication, image blur correction amounts that respectively correspond to partial images included among the plurality of continuous images, and a second image blur correction amount obtainment unit configured to obtain, based on a detection result of the shake detection unit and on the shake information obtained through the communication, image blur correction amounts that respectively correspond to partial images included among the plurality of continuous images with use of a method different from a method used by the first image blur correction amount obtainment unit; and an image blur correction unit configured to perform image blur correction with respect to the plurality of continuous images based on image blur correction amounts obtained by the plurality of image blur correction amount obtainment units, wherein at least one of the plurality of image blur correction amount obtainment units obtains the image blur correction amounts respectively in correspondence with the plurality of continuous images.

18. A control method for an image blur correction apparatus, the control method comprising:

obtaining shake information from a plurality of shake detection units configured to detect a shake;

calculating an image blur correction amount of a captured image based on the shake information obtained from the plurality of shake detection units; and controlling the obtaining so that shake information from at least one of the plurality of shake detection units is obtained in correspondence with each one of a plurality of continuous captured images, and so that an image for which corresponding shake information from first shake detection unit among the plurality of shake detection units cannot be obtained, and an image for which corresponding shake information from second shake detection unit thereamong cannot be obtained, take place cyclically.

19. A control method for an image capturing apparatus having an image capturing sensor that captures a plurality of continuous images on a first cycle, the control method comprising:

detecting a shake based on the plurality of continuous images;

obtaining a plurality of image blur correction amounts including firstly obtaining, based on shake information obtained from a mounted lens apparatus through communication, image blur correction amounts that respectively correspond to partial images included among the plurality of continuous images, and secondly obtaining, based on a shake detection result and on the shake information obtained through the communication, image blur correction amounts that respectively correspond to partial images included among the plurality of continuous images with use of a method different from a method used by the firstly obtaining; and performing image blur correction with respect to the plurality of continuous images based on image blur correction amounts obtained by the obtaining, wherein at least one of the plurality of image blur correction amount obtaining obtains the image blur correction amounts respectively in correspondence with the plurality of continuous images.

20. A non-transitory computer-readable storage medium having stored therein a program for causing a computer to execute each step of the control method for an image blur correction apparatus, the control method comprising:

obtaining shake information from a plurality of shake detection units configured to detect a shake;

calculating an image blur correction amount of a captured image based on the shake information obtained from the plurality of shake detection units; and controlling the obtaining so that shake information from at least one of the plurality of shake detection units is obtained in correspondence with each one of a plurality of continuous captured images, and so that an image for which corresponding shake information from first shake detection unit among the plurality of shake detection units cannot be obtained, and an image for which corresponding shake information from second shake detection unit thereamong cannot be obtained, take place cyclically.

21. A non-transitory computer-readable storage medium having stored therein a program for causing a computer to execute each step of the control method for an image capturing apparatus having an image capturing sensor that captures a plurality of continuous images on a first cycle, the control method comprising:

detecting a shake based on the plurality of continuous images;

obtaining a plurality of image blur correction amounts including firstly obtaining, based on shake information obtained from a mounted lens apparatus through communication, image blur correction amounts that respectively correspond to partial images included among the plurality of continuous images, and secondly obtaining, based on a shake detection result and on the shake information obtained through the communication, image blur correction amounts that respectively correspond to partial images included among the plurality of continuous images with use of a method different from a method used by the firstly obtaining; and performing image blur correction with respect to the plurality of continuous images based on image blur correction amounts obtained by the obtaining, wherein at least one of the plurality of image blur correction amount obtaining obtains the image blur correction amounts respectively in correspondence with the plurality of continuous images.

\* \* \* \* \*